United States Patent Office 2,750,979
Patented June 19, 1956

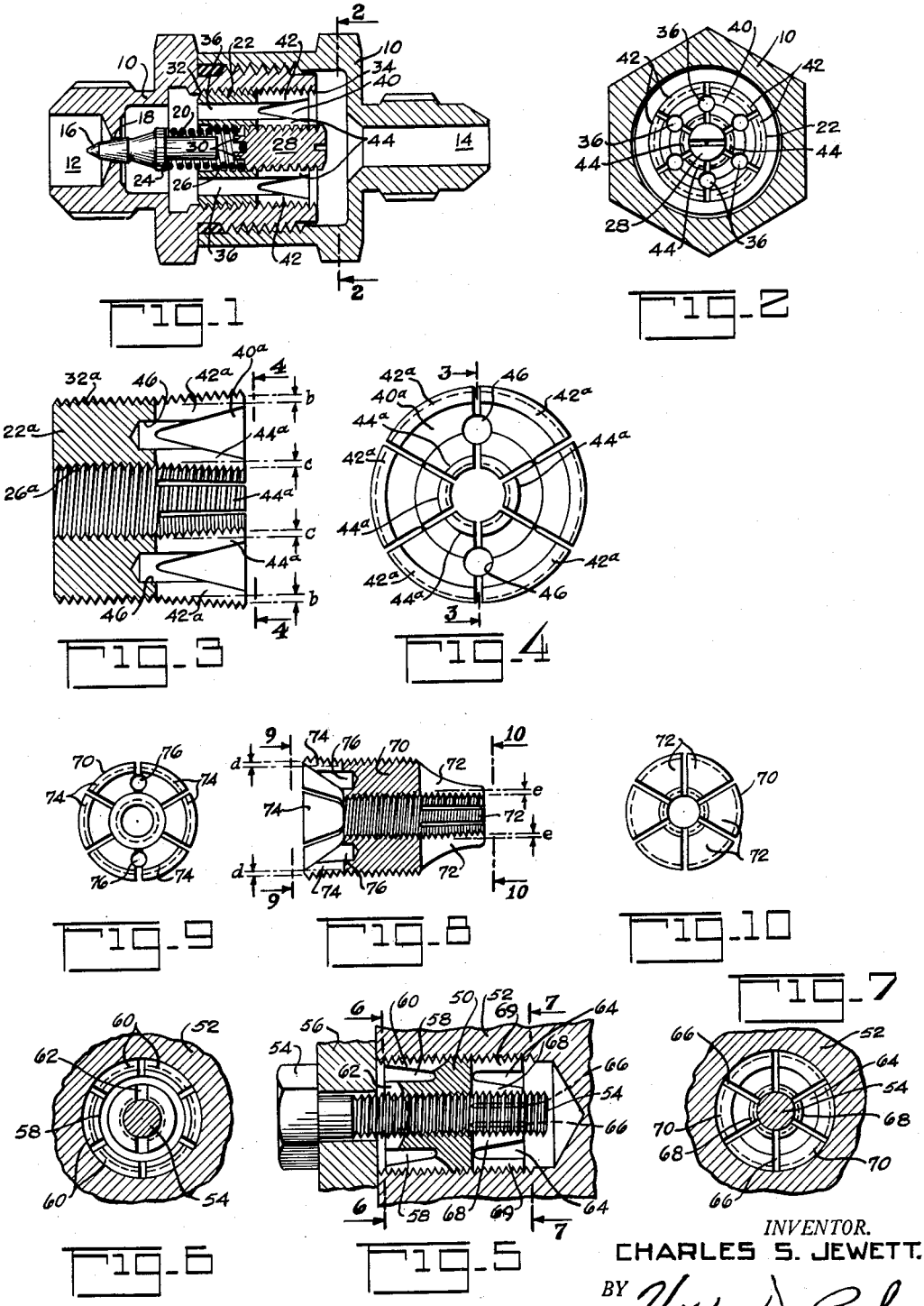

2,750,979

INTERNALLY AND EXTERNALLY THREADED BUSHING HAVING INTERNAL AND EXTERNAL LOCKING MEANS

Charles S. Jewett, Hasbrouck Heights, N. J., assignor to Curtiss-Wright Corporation, a corporation of Delaware Application May 6, 1952, Serial No. 286,332

1 Claim. (Cl. 151—21)

The invention relates to threaded bushings and is particularly directed to a threaded bushing construction in which the internal and external threads of the bushing are both self-locking.

An object of the present invention comprises the provision of a bushing having internal and external threads and having a novel self-locking construction whereby the bushing automatically locks to the member into which the bushing is screwed and automatically locks to the member screwed into the bushing.

A further object of the invention comprises the provision of an internally and externally threaded bushing having two groups of circumferentially-spaced segments extending axially therefrom with one group of said segments having external threads forming a continuation of the bushing external threads and having an outward set so as to grip the threads of the member into which the bushing is screwed and with the other group of segments having internal threads forming a continuation of the bushing internal threads and having an inward set so as to grip the threads of the member which is screwed into the bushing.

Other objects of the invention will become apparent upon reading the annexed detailed description in connection with the drawing in which:

Fig. 1 is an axial sectional view through a spring loaded valve incorporating a bushing embodying the invention;

Fig. 2 is a sectional view taken along line 2—2 of Fig. 1;

Fig. 3 is an enlarged sectional view of a slightly modified form of bushing embodying the invention and taken along line 3—3 of Fig. 4;

Fig. 4 is an end view taken along line 4—4 of Fig. 3;

Fig. 5 is a sectional view illustrating another use of the invention and incorporating a further modified bushing construction;

Figs. 6 and 7 are end views taken along line 6—6 and 7—7 respectively of Fig. 5;

Fig. 8 is a sectional view through a still further modified bushing construction embodying the invention; and Figs. 9 and 10 are end views taken along lines 9—9 and 10—10 respectively of Fig. 8.

Referring first to Figs. 1–2 of the drawing, the invention is illustrated in connection with a two-piece valve body 10 having an inlet port 12 and an outlet port 14. A valve element 16 is mounted for axial movement within the valve body toward and away from a valve seat 18. The valve element 16 is urged in its closing direction by spring 20 against the pressure of the fluid supplied to the inlet port 12. One end of the spring 20 is anchored within a bushing 22 and the other end of the spring bears against a shoulder 24 on the valve element 16.

The valve body 10 is designed for use in parallel with a plurality of such valves for equally dividing liquid fuel supplied to a manifold to which the inlet ports of the valves are connected. Accordingly it is essential that each valve spring be adjustable so as to have the same spring rate and exert the same force on its valve. For this purpose means are provided to adjust the number of active coils of the valve spring 20 and for adjusting the spring force without changing the number of active coils.

The bushing 22 has internal threads 26 and the coils of the spring 20 extending into the bushing mate with the internal threads at one end of said bushing. In addition a screw 28 is threaded into the bushing 22 and the adjacent end of the spring extends between fingers 30 projecting from the inner end of said screw so that the spring 20 and screw 28 are connected together for joint rotation along the internal threads 26 of said bushing. The bushing 22 also has external threads 32 meshing with internal threads 34 on the valve body. In addition, the bushing 22 has holes 36 extending therethrough for passage of fluid from the valve seat 18 to the outlet port 14. The holes 36 also can be used as wrench holes for screwing the bushing into the valve body 10.

With the structure so far described, the spring 20 urges the valve 16 in a closing direction against the force exerted by the fluid pressure in the inlet port 12 against the head end of said valve. The force exerted by the spring 20 may be increased or decreased by screwing the bushing along the valve body threads 34 toward or away from the valve seat 18. In addition the number of active coils of the spring 20 between the bushing 22 and valve 16 can be increased or decreased by screwing the screw 28 to the right or left respectively (as viewed in the drawing) along the internal threads 26 of said bushing thereby changing the spring rate.

The bushing 22 is constructed so that its internal and external threads are self-locking. For this purpose one end of the bushing is provided with an annular axially-opening groove 40. In addition the grooved end of the bushing is slotted to form two groups of circumferentially-spaced segments 42 and 44 extending axially from the bushing and separated by the groove 40. The bushing 22 may be externally threaded before or after the formation of the annular groove 40 and segments 42 and 44. In either case the external surface of each outer segment 42 has threads forming a continuation of the external threads 32 of the bushing 22 and the internal surface of each inner segment 44 has threads forming a continuation of the internal threads 26 of the bushing 22. After the bushing and its segments have been threaded, as described, each of the outer segments 42 is given a slight initial outward set or deflection so that when the bushing 22 is screwed into the valve body 10 the outer segments 42 are deflected inwardly, as stiff springs, to resiliently grip the valve body threads 34 thereby securely holding the bushing 22 in any position of adjustment of said bushing along said valve body threads. In addition each of the inner segments 44 is given a slight initial inward set or deflection so that when the screw 28 is screwed into the bushing 22, the inner bushing segments 44 are deflected outwardly, as stiff springs, to resiliently grip the screw 28 thereby securely holding the bushing 22 in any position of adjustment of said screw within the bushing.

The self-locking segments 42 and 44 may be given said initial set, for example, in a manner such as used in setting corresponding segments of conventional self-locking nuts. The annular groove 40 makes it convenient to set said segments by an annular wedge tool driven into said groove. When the outer segments 42 are set by said annular wedge tool the inner segments 44 are restrained against deflection by a back-up member and when the inner segments 44 are set the outer segments 42 are restrained against deflection by a back-up member.

A slightly modified self-locking bushing is illustrated in Figs. 3 and 4. The parts of the bushing of Figs. 3 and 4 have been designated by the same reference numerals but with a subscript *a* added thereto as the corresponding parts of the bushing of Figs. 1 and 2. The bushing 22*a* is like the bushing 22 except the fluid passages or holes 36 have been eliminated and in their place two blind wrench holes 46 have been provided for screwing the bushing into place. The initial set or deflection of the outer bushing segments 42*a* has been indicated in Fig. 3 by the deflection *b* of the end of each said segment and the initial set or deflection of the inner bushing segments 44*a* has been indicated by the deflection *c* of the end of each said inner segment. For purpose of illustration the magnitude of said deflections *b* and *c* has been exaggerated in the drawing. As in Fig. 1, the segments 42*a* and 44*a* are separated by an annular groove 40*a* and the outer surface of each segment 42*a* has threads forming a continuation of the external bushing threads 32*a* and the inner surface of each segment 44*a* has threads forming a continuation of the internal bushing threads 26*a*. The bushing 22*a* may be threaded into a member to provide a tapped hole for a bolt or the like. Such a use of a self-locking bushing is illustrated in Figs. 5–7.

In each of the bushings 22 and 22*a* the outer group of segments 42 or 42*a* and the inner group of segments 44 or 44*a* are both formed at the same end of the bushing. In assembly, the threads of each group of said self-locking segments should be the last to engage. Thus, as viewed in Fig. 1, the screw 28 is screwed into the bushing from the left end of the bushing and the bushing with the screw 28, together with the spring 20 and valve 16, is screwed into the valve body from the right end of its threads 34. For assembly reasons it may be necessary that the inner self-locking segments and the outer self-locking segments be formed at opposite ends of the bushing. Such an arrangement is also illustrated in Figs. 5–7.

In Figs. 5, 6 and 7, an internally and externally threaded bushing 50 is screwed into a member 52 and a bolt 54 is screwed into the bushing 50 to secure a member 56 to the member 52. An annular axially-opening groove 58 is provided at the outer end of the bushing and the outer portion of the bushing surrounding the groove is slotted to form circumferentially-spaced outer segments 60. A screw-driver-type slot 62 is formed in the inner portion of the bushing surrounded by the groove 58 for driving the bushing into the member 52. An annular axially-opening groove 64 is also formed in the other end of the bushing 50. This latter end of the bushing is slotted as indicated at 66 to form circumferentially-spaced inner segments 68. For convenience of fabrication the slots 66 extend across the bushing so that outer segments 69 are also formed. As will appear, however, the outer segments 69 have no locking function. Prior to use of the bushing 50, the outer segments 60 are given an initial outward set and the inner segments 68 are given an inward set. Accordingly the outer segments 60 resiliently grip the threads of the member 52 to hold the bushing in place and the inner segments 68 resiliently grip the bolt to constrain the bolt against loosening.

Figs. 8, 9 and 10 illustrate another modification in which a bushing 70, like the bushing 50, has inner and outer set segments disposed at opposite ends of the bushing. The bushing 70 is internally and externally threaded. One end of the bushing is externally tapered toward said end and said tapered end is slotted to form circumferentially-spaced inner segments 72 extending axially from the bushing and having internal threads forming a continuation of the internal threads of the bushing. The other end of the bushing 70 is internally tapered toward said other end and said internally tapered end is slotted to form circumferentially-spaced other segments 74 extending axially from the bushing and having external threads forming a continuation of the external threads of the bushing. As in the case of each of the other self-locking bushings, the group of outer segments 74 is given a slight initial outward set or deflection and the group of inner segments 72 is given a slight initial inward set or deflection. This outward and inward set is indicated in Fig. 8 by the deflections *d* and *e* respectively and for purpose of illustration these deflections have been exaggerated in the drawing. Blind holes 76 may also be formed in one end of the bushing to which a wrench may be applied for screwing the bushing 70 into position, for example, into the threaded hole in the member 52 of Fig. 5. In lieu of or in addition to the wrench holes 76, the ends of the segments 74 may be provided with an outwardly extending flange to which a wrench may be applied for screwing the bushing 70 into position.

As hereinafter used, by the phrase "free condition" of the bushing is meant the condition of the bushing before it is screwed into the body into which it is to be inserted and before any screw or other machine element is screwed into the bushing.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

An internally and externally threaded self-locking bushing having an annular groove in each end surface, the portion of the bushing disposed radially outwardly of the groove at one end of the bushing comprising a first group of circumferentially-spaced segments extending axially from the bushing and the portion of the bushing disposed radially inwardly of the groove at the other end of the bushing comprising a second group of circumferentially-spaced segments extending axially from the bushing, the segments of the first group having external threads forming a continuation of the external bushing threads and having an outward set and the segments of the second group having internal threads forming a continuation of the internal bushing threads and having an inward set.

References Cited in the file of this patent

UNITED STATES PATENTS

| 1,080,332 | Dodds | Dec. 2, 1913 |
| 1,081,274 | Mueller | Dec. 9, 1913 |
| 2,455,885 | Theurer | Dec. 7, 1948 |

FOREIGN PATENTS

| 19,218 | Great Britain | Mar. 25, 1915 |
| 21,878 | France | Apr. 9, 1921 |